United States Patent [19]
Beard et al.

[11] Patent Number: 6,124,800
[45] Date of Patent: Sep. 26, 2000

[54] RADIO-FREQUENCY LAN AND WAN COMMUNICATION SYSTEM FOR ROUTE DELIVERY APPLICATIONS OR THE LIKE

[75] Inventors: Paul Beard, Milpitas, Calif.; Alan G. Bunte, Cedar Rapids, Iowa

[73] Assignee: Intermec IP Corp., Woodland Hills, Calif.

[21] Appl. No.: 08/915,860

[22] Filed: Aug. 21, 1997

Related U.S. Application Data

[60] Provisional application No. 60/024,254, Aug. 21, 1996.

[51] Int. Cl.$^7$ ............................................. H04Q 7/20
[52] U.S. Cl. ........................ 340/825.35; 340/825.54; 340/825.69; 340/825.989; 340/825.99
[58] Field of Search ................. 340/825.35, 825.54, 340/825.69, 989, 990, 991, 992, 993; 370/338; 455/517, 39, 500

[56] References Cited

U.S. PATENT DOCUMENTS

| | | | |
|---|---|---|---|
| 4,766,548 | 8/1988 | Cedrone et al. | 364/479.06 |
| 5,194,860 | 3/1993 | Jones et al. | 455/517 |
| 5,337,253 | 8/1994 | Berkovsky | 340/825.35 X |
| 5,339,250 | 8/1994 | Durbin | 340/825.35 X |
| 5,369,401 | 11/1994 | Haines | 340/825.35 |
| 5,747,786 | 5/1998 | Cargin, Jr. et al. | 235/472 |
| 5,822,739 | 10/1998 | Kara | 340/825.35 |
| 5,877,698 | 3/1999 | Kusnier et al. | 340/825.35 |

*Primary Examiner*—Daniel S. Hunter
*Assistant Examiner*—Yemane Woldetatios
*Attorney, Agent, or Firm*—Suiter & Associates PC

[57] ABSTRACT

A route delivery communication system for collecting and processing order and related data from product delivery units such as vending machines and the like, grocery and merchandise retailers, pharmacies, restaurants hospitals, clinics, warehouses, and factories, or the like, or for collecting and processing package collection data from package delivery boxes (such as mailboxes) is described. The system includes a plurality of notifiers each of which including a transceiver and a data gathering transducer for connection to an information collection point such as a vending machine or mailbox. The system also includes a plurality of prompters each including a transceiver for activating, queuing, and receiving data from the notifiers. The prompters further include a user display for communicating with a user and a user input for allowing a user to access and manipulate the prompter and data collected by the prompter from the notifiers. The system also includes at least one guardian for queuing, each of which including a transceiver for activating, queuing, and receiving data from the prompters. The guardian further includes a user display input for communicating with a user and also includes a user input for allowing a user to access and manipulate the guardian and the data collected by the guardian from the prompters.

25 Claims, 4 Drawing Sheets

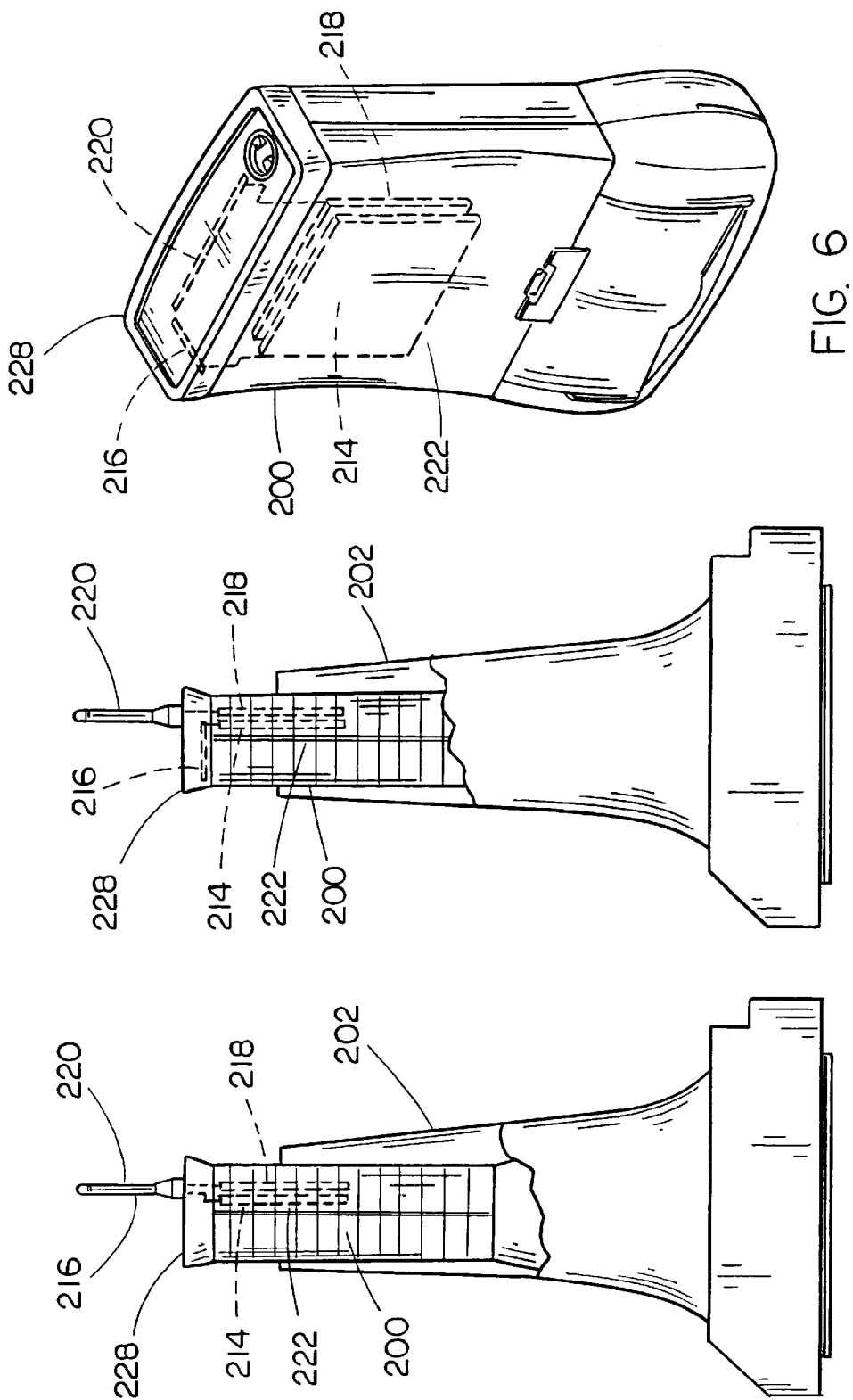

RADIO-FREQUENCY LAN AND WAN COMMUNICATION SYSTEM FOR ROUTE DELIVERY APPLICATIONS OR THE LIKE

This invention claims the benefit of provisional Application No. 60/024,254 filed Aug. 21, 1996.

BACKGROUND OF THE INVENTION

The present invention generally relates to the field of route delivery systems, and more particularly to a route delivery system which utilizes radio-frequency data communication over both a local area network (LAN) and a wide area network (WAN).

There are many applications in which it is desirable to be able to utilize radio-frequency data communications over both a local area network and a wide area network. For example, in route delivery applications, it would be desirable for a route delivery vehicle operator to know which type and what quantity of product is needed for each product end point location such as a vending machine or store on the delivery route without the need for the operator to enter the end point location to determine which product needs restocking. Such information may be communicated from the product end point location to the vehicle operator over a local area radio-frequency network. Thus, the operator would only require a single trip into the product end point location to bring in the product to be restocked wherein the initial trip for determining product stocking requirements is eliminated. Further, knowing before hand specific product stocking requirements allows the operator to only carry the exact identity and quantity of product needed to be restocked.

In addition, it is often desirable to be able to instantaneously communicate with a central management location the information concerning the product delivered to a product end point location from a route delivery vehicle. For example, the delivery vehicle could communicate with a central management location over a wide area radio-frequency network to indicate product information such as the identity and quantity of product delivered to the product end point locations such that real time inventory and management decisions may be made based on communicated product data. Thus, product information may be remotely tracked and controlled by communications from in-field route delivery vehicles over a wide area radio-frequency network.

SUMMARY OF THE INVENTION

Accordingly, it is a goal of this invention to provide a route delivery system which utilizes radio-frequency communications over both a local area network and a wide area network.

Another goal of the present invention is to provide a communication unit located on a route delivery vehicle which receives product data from a communication unit located in a product end point location wherein product data is communicated over a local area radio-frequency network.

A further goal of the present invention is to provide a communication unit located on a route delivery vehicle which transmits product data from a communication unit located in a central management location wherein product data is communicated over a wide area radio-frequency network.

These and other goals may be achieved by utilizing a data terminal as a communication unit wherein the data terminal includes at least one radio frequency transmitter.

More specifically, a communication unit located in a route delivery vehicle communicates over a local area radio frequency network at a first carrier frequency with a communication unit located in a product end point location, and communicates over a wide area radio-frequency network at a second carrier frequency with a communication unit located in a central management location.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 4 is a side view illustration of the communication unit of FIG. 2 in which a communication unit having two transceivers sharing a common antenna is shown;

FIG. 5 is a side view illustration of the communication unit of FIG. 2 in which a communication unit having two transceivers each having independent antennas is shown;

FIG. 6 is an isometric illustration of the communication unit of FIG. 2 in which a communication unit having two transceivers sharing a further common antenna is shown;

DETAILED DESCRIPTION

Reference will now be made in detail to the presently preferred embodiment of the invention, an example of which is illustrated in the accompanying drawings.

Figure 1:
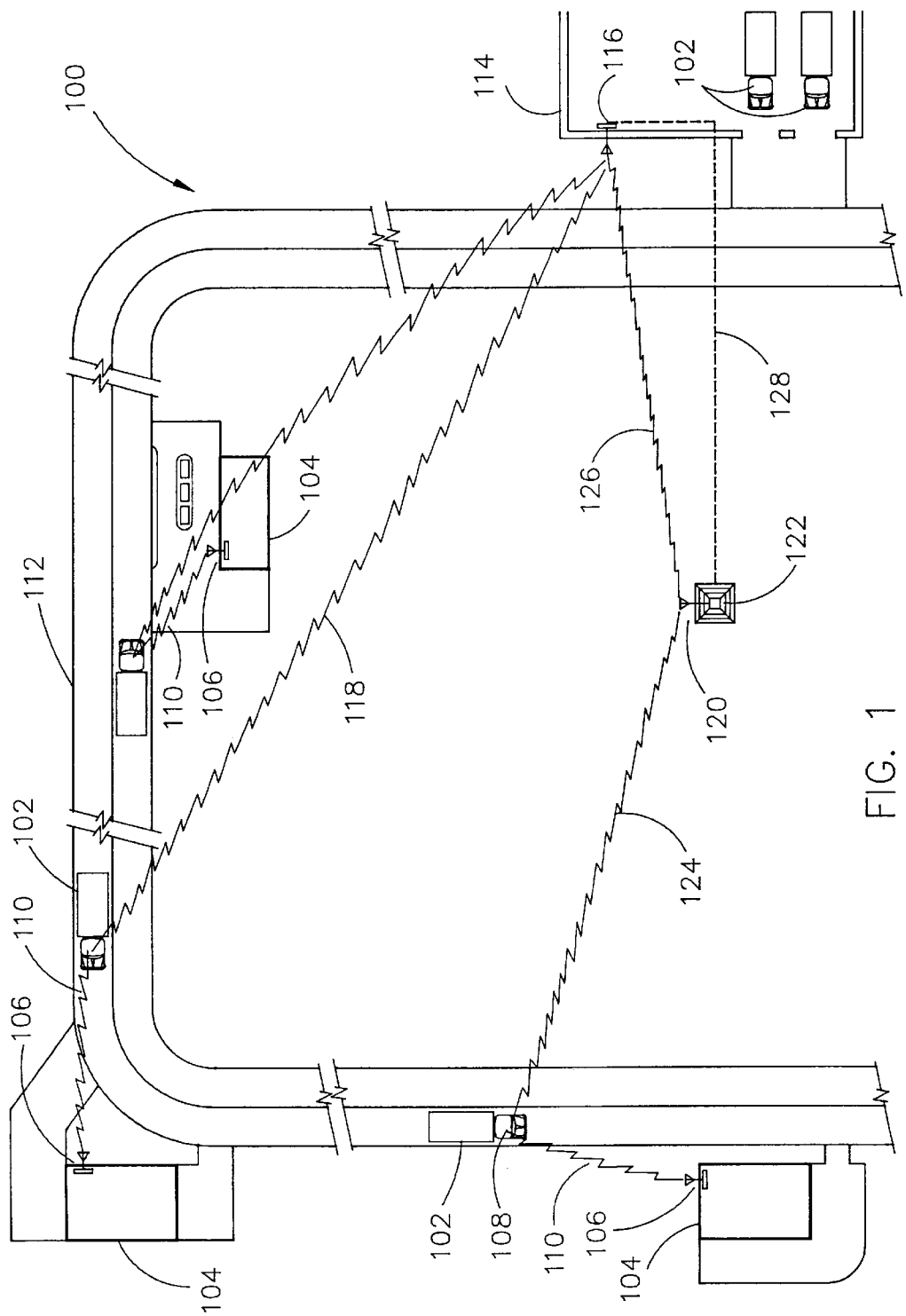
FIG. 1 is a top plan view of the route delivery communication system in accordance with the present invention.

Referring now to FIG. 1, a top plan view of the route delivery communications system in accordance with the present invention is shown. The route delivery communication system 100 may be utilized in product delivery systems such as vending machines and the like, grocery and merchandise retailers, pharmacies, hospitals, restaurants, clinics, warehouses and factories or the like, or for package and parcel delivery systems, and so on. Generally, a route delivery vehicle 102 is utilized to transport goods and or services and related equipment to a remote product or service end point location 104. The product or end point location 104 may be a vending machine or soda dispensing machine or the like in an office or commercial building, school, library, civic center etc., for example. The end point location 104 may also be a merchandise retailer or wholesaler, or grocery store, for example. The end point location 104 utilizes a notifier communication unit 106 to collect, process and store product information data. Typically the product data includes such information as the identity and amount of a given product such that the product restocking needs of the end point location 104 are tracked and stored. For example, in the case of a soda dispenser, the number of each type of soda which the soda dispenser is short may be determined and stored in the notifier unit 106.

The route delivery vehicle 102 includes a prompter unit 108 which may be utilized for route management functions. The prompter unit 108 and the notifier unit 106 communicate over a local area radio-frequency network 110. The prompter unit 108 polls the notifier unit 106 when the route delivery vehicle enters within range of the local area radio-frequency network 110. Specific product information obtained by the notifier unit 106 may be communicated to the prompter unit 108 which may be communicated in turn to the operator of the route delivery vehicle 102. If the communicated product information indicates there are no product stocking requirements, then the delivery vehicle need not stop at that particular product end point location 104 and may continue on to the next product end point location. If the communicated product information indicates stocking requirements, the route delivery vehicle may stop at the product end point location 104 to fulfill the stocking requirements.

The exact identity and quantity of product required for restocking may be communicated from the notifier unit 106 to the prompter unit 108 prior to the operator of the route delivery vehicle 102 entering the product end point location 104. Thus, the operator of the route delivery vehicle 102 need not enter the product end point location 104 to determine the stocking requirements of the end point location 104, but is only required to make one trip to deliver the required product thereinto. Further, because the operator has received the stocking requirements of the product end point location 104 prior to entry, the operator may bring in the exact quantity and identity of product required, thereby eliminating any guessing or needless product transport.

Thus, each end point location 104 on a given delivery route 112 may have a notifier unit 106 performing product data collecting and tracking functions as herein described. Further, multiple route delivery vehicles 102 each having a prompter unit may be utilized for continuous 24 hour shifts, larger size routes or greater number of routes 112, for example. Each product end point location 104 may implement a local area radio-frequency network 110 for data communication between the notifier units 106 of the product end point locations 104 and the prompter units 108 of the route delivery vehicles 102.

In addition to communication over a local area radio-frequency network, the prompter units 108 of the route delivery vehicles 102 may communicate with a central management location 114 utilizing a guardian communication unit 116 located therein over a wide area radio-frequency communication network 118. The prompter unit 108 may communicate directly with the guardian unit 116 via direct radio communications as shown at 118, or may communicate with guardian unit via a signal repeater system wherein a repeater unit 120 located at various strategic location such as a tower 122, wherein the wide area radio-frequency network signals 124 are retransmitted as a repeated signal. Alternatively, the wide area radio-frequency network signals may be repeated over hard wire communication lines 128 (e.g., telephone lines, fiber optic lines, etc.) which feed directly to the central management location 114.

Figure 2:
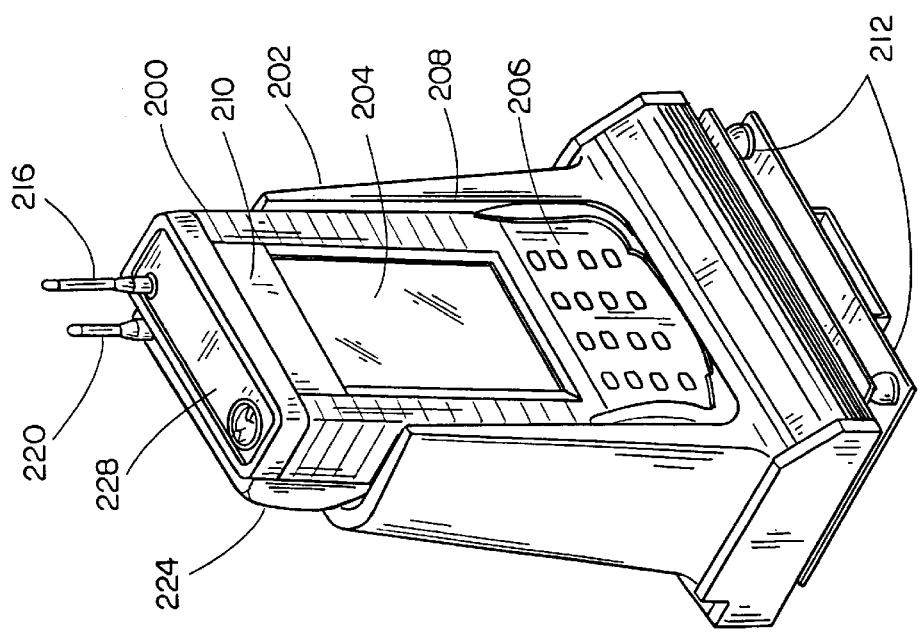
FIG. 2 is an isometric view of a communication unit typical of the like utilized in accordance with the present invention.

Referring now to FIG. 2, a data terminal and docking unit are shown which may be utilized as the communications units in accordance with the present invention. The data terminal 200 may be operably and removably insertable into a docking unit 202 which is designed to receive the form of the data terminal 200. The data terminal 200 typically may include the electronics necessary to function as a computer terminal e.g., microprocessor, memory, data bus, etc. Further, the terminal 200 includes a display 204 for displaying data and various types of information. The display 204 includes means for receiving tactile input from a finger or stylus for the entry of data into the terminal 200 and for various other operating functions e.g., control of the operating system of the data terminal 200 via a user interface. The data terminal 200 also includes a keypad 206 comprising and array of keys which may be utilized for manual data entry.

The docking receptacle 202 operably receives the data terminal 200 during periods when the terminal is not being operated by hand. For example, the docking unit 202 may be mounted in a route delivery vehicle such as the route delivery vehicle 102 shown in FIG. 1. The docking unit 202 may provide a dc voltage provided by the alternator of the vehicle for charging the batteries of the data terminal 200 while the terminal is docked in the docking unit 202. The docking unit 202 includes a front recess 208 which allows for the front face 210 of the data terminal 200 to be displayed while the terminal is docked therein. Exposing the front recess 210 of the data terminal 202 allows for the display 204 and the keypad 206 to be exposed while the terminal is docked such that the terminal may be operable during docking. Thus, the data terminal 200 may be operable while docked in the docking unit 202 such that the battery power source of the data terminal 200 may be simultaneously charged. The docking unit 202 may include shock dampening mounts for reducing the translation of vibrations caused by the delivery vehicle 102 to the data terminal 200.

Figure 3:
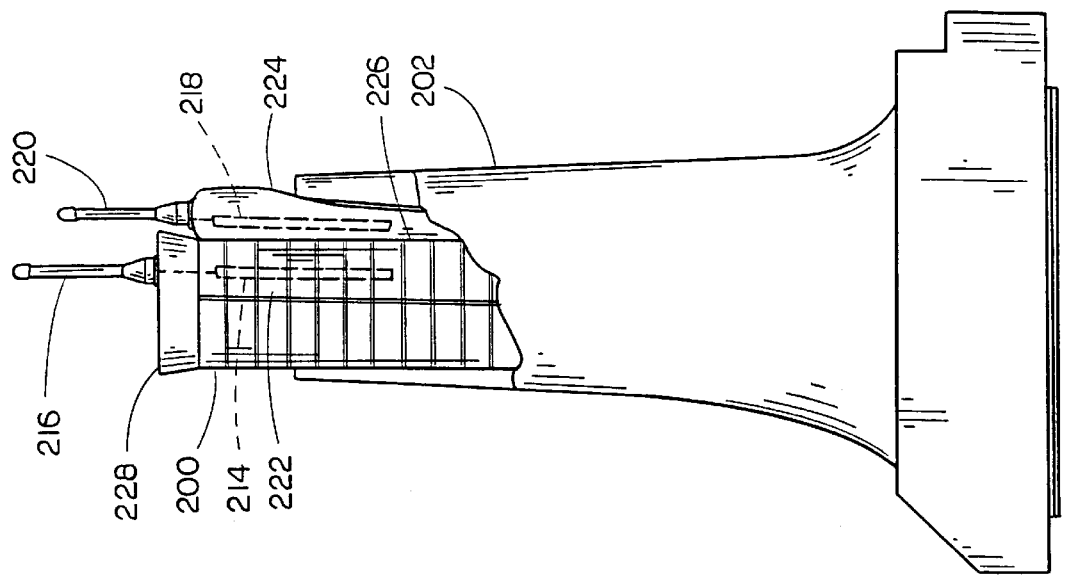
FIG. 3 is a side view illustration of the communication unit as shown in FIG. 2 in which the in which radio frequency transducers utilized in accordance with the present invention are shown.

Referring now to FIG. 3, a side view of the data terminal of FIG. 2 is shown. The data terminal 200 may communicate over both a local area radio-frequency network and a wide area radio frequency network. Thus the terminal 200 may have a first radio 214, or LAN radio, for communicating over the local area radio-frequency network. The LAN radio 214 may be incorporated as a PCMCIA card (a.k.a. PC card) operably mounted in a PCMCIA card receptacle 222 internally located in the data terminal 200. The LAN radio 214 utilizes a first antenna 216, or LAN antenna, which is tuned to carrier frequency of the local area radio frequency network. The LAN antenna 216 may be mounted on a removable lid 228 which allows for access to the PCMCIA card receptacle 222 for insertion and removal of PCMCIA cards. The data terminal 200 may also utilize a second radio 218, or WAN radio, for communicating over a wide area radio-frequency network. The WAN radio 218 may be incorporated as an external attachment pod 224 which attachably integrates with the data terminal 200 by connection to the backside 226 of the terminal 200. The WAN radio 218 utilizes a second antenna 220, or WAN antenna, which is tuned to the carrier frequency of the wide area radio-frequency network. The WAN antenna 220 may be mounted on the external attachment pod 224. Conversely, the LAN radio 214 may be incorporated in the external attachment pod 224 and the WAN radio 218 may be incorporated as a PCMICA card each utilizing respective antennas.

Referring now to FIG. 4, the terminal of FIG. 3 is shown having a variation of the configuration of the radios in accordance with the present invention. Both the LAN radio 214 and the WAN radio 218 may be incorporated as PCMICA cards both simultaneously mounted in the PCM- CIA card receptacle 222 of the data terminal 200. Both the LAN antenna 216 and the WAN antenna 220 may be mounted on lid 228. Alternatively, the LAN antenna 216 and the WAN antenna 220 may be integrated as a single antenna as shown being tuned for the carrier frequencies of both the LAN and the WAN, or a compromise thereof.

Referring now to FIG. 5, the data terminal of FIG. 4 is shown further illustrating an alternative configuration of the radios and antennas. The data terminal 200 may include both the LAN radio 214 and the WAN radio 218 as PCMCIA card units. The LAN radio 214 may utilize LAN antenna 216 which is incorporated within lid 228. The WAN radio 218 may utilize a WAN antenna 220 which is externally mounted on lid 228. Conversely, the LAN radio 214 may utilize a LAN antenna 216 which is externally mounted and the WAN radio 218 may utilize a WAN antenna 220 which is internally mounted in lid 228.

Referring now to FIG. 6, a further alternative configuration of the data terminals of FIGS. 3–5 is shown. The data terminal 200 may utilize a LAN radio 214 and a WAN radio 218 incorporated as PCMCIA cards mounted in the PCMCIA card receptacle 222 of the data terminal. The LAN radio 214 may utilize a LAN antenna 216 which is integrated in lid 228. The WAN radio 218 may utilize a LAN antenna 220 which is simultaneously integrated in lid 228. Utilizing both the LAN radio 214 and the WAN radio 218 internally to the data terminal 200 eliminates the requirement of an external attachment pod 224 shown in FIGS. 2 and 3 thereby reducing the bulk of the terminal 200. Further, the simultaneous utilization of the LAN antenna 216 and the WAN antenna 220 in lid 228 eliminates the utilization of an external type antenna such as the antennas 216 and 220 shown in FIGS. 2–5 thereby reducing the effective length of the terminal and avoiding problems with replacement of the external antenna due to breaking, for example. Thus, the LAN radio 214, WAN radio 218, LAN antenna 216, and WAN antenna 220 may be completely internally integrated with the data terminal 200.

Figure 7:
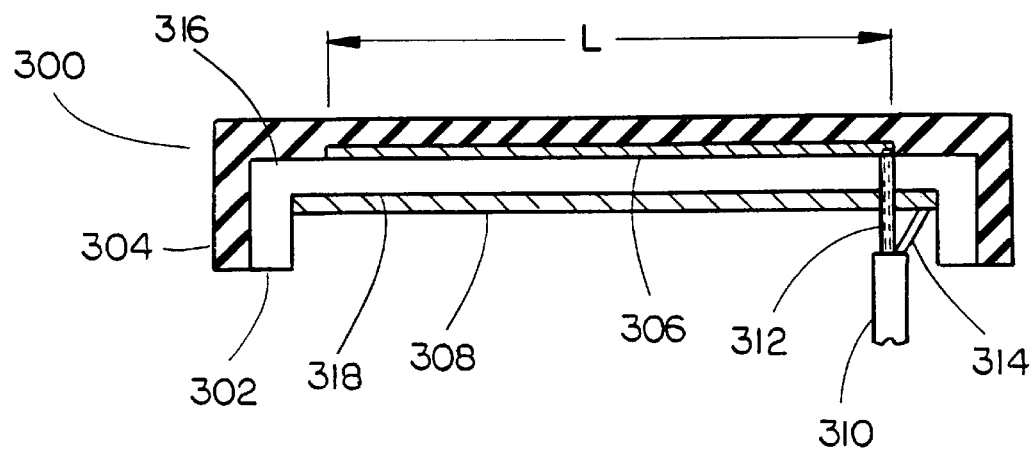
FIG. 7 is an illustration of a co-molded data terminal lid having an antenna integrated therewith.

Referring now to FIG. 7, the lid of the data terminal of FIGS. 2–5 is shown illustrating the antenna of FIGS. 5 and 6 integrated with the lid. The lid having a co-molded internal antenna is generally designated as 300 and may substantially correspond to lid 228 of FIGS. 5 and 6 being substitutable therewith. The antenna lid 300 generally comprises a support frame 302 comprising a lightweight, durable high impact plastic, resin, composite or similar material. The support frame includes an outer rubber surface 304 forming the exterior surface of the lid 300. The rubber surface 304 is co-molded with the plastic support frame 302 and bonded thereto to form a single integrated lid unit 300. The antenna 306 comprises a metallic conductor of length L disposed on the exterior surface 316 of support frame 302. The length L of the antenna 306 is a function of the carrier frequency of the radio with which the antenna is utilized, such as LAN radio 214 of FIGS. 5 and 6 which utilizes antennas 216 and 220. A metallic grounding plane 308 may be disposed on the interior surface 318 of support frame 302 for providing an identical charge image of antenna 306 such that length L of the antenna may be one-quarter of the carrier wavelength.

The antenna 306 is contained and secured within the rubber coating which encompasses the antenna 306 during the co-molding process, thereby sandwiching the antenna 306 between support frame 302 and the outer rubber coating 304. The ground plane conductor 308 may comprise a thin sheet of conductor material or foil physically or chemically adhered to the interior surface 318 of support frame 302. Alternatively, the ground plane conductor 308 may comprise a metallic coating sprayed on the interior surface 318 of support frame 302 immediately after the molding process before complete curing to integrate the coating 308 with the plastic material of support frame 302, or may be chemically adhered to support frame 302 after curing wherein a chemical adhesive may be utilized, for example.

A connector cable 310 may be utilized to connect antenna 306 and ground plane conductor 308 to an internal radio disposed in the interior of the data terminal with which the antenna 306 and lid 300 is utilized, such as the PCMCIA radio card 214 shown in FIGS. 5 and 6. The conductor cable 310 may be a coaxial type conductor having a central insulated conductor 312 connected to the antenna 306 surrounded by a shielding conductor 314 connected to the ground plane conductor 308. The conductor cable 310 may have a suitable characteristic impedance which matches the impedance of the antenna 306 with the output impedance of the radio, such as LAN radio 214 shown in FIG. 6.

Figure 8:
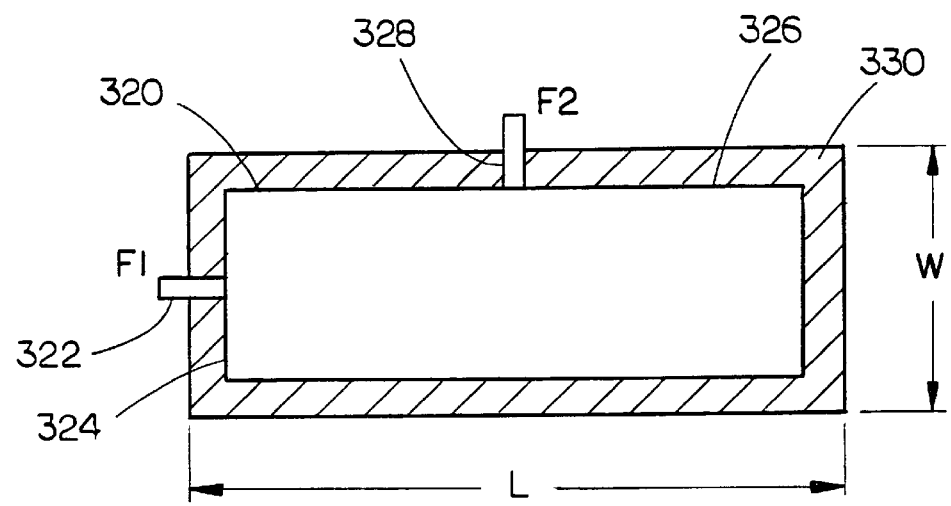
FIG. 8 is an illustration of a dual frequency antenna which may be utilized with the radio-frequency LAN and WAN communication system of the present invention.

Referring now to FIG. 8, a dual frequency antenna is shown for utilization with the LAN and WAN radios of the present invention. The dual frequency antenna 320 may be utilized in the co-molded lid 300 shown in FIG. 7 in lieu of the single frequency antenna 306 shown therein. The dual frequency antenna 320 of FIG. 8 operates substantially similarly to the antenna 306 of FIG. 7 except the dual frequency antenna 320 may cooperate with two radios simultaneously such as the LAN radio 214 and the WAN radio 218 both shown in FIG. 6, for example. The dual frequency antenna 320 receives a first feed line F1 at a first end 324 of the antenna 320 wherein feed line F1 comprises a conductor cable 322 similar to the center conductor 312 of the coaxial type conductor 310 of FIG. 7. The shielding conductor of feed line F1 is connected to a ground plane conductor 330 similar to ground plane conductor 308 illustrated in FIG. 7. The antenna 320 also receives a second feed line F2 at a first side 326 of the antenna wherein side 326 is adjacent to end 324. Feed line F2 comprises a conductor 328 and coaxial cable in a like manner as feed line F1.

The length L of the dual frequency antenna 320 is a function of the wavelength of the carrier signal utilized with the radio corresponding to feed line F1. The utilization of a ground plane conductor 330 or ground plane 308 of FIG. 7 allows for the length L of the antenna 320 to be one-quarter of the carrier signal wavelength of the radio corresponding to feed line F1. Similarly, the width W of the dual frequency antenna is a function of the carrier signal utilized with the radio corresponding to feed line F2. The utilization of a ground plane conductor 330 such as ground plane 308 of FIG. 7 allows for the width W of the antenna 320 to be one-quarter of the carrier signal wavelength of the radio corresponding to feed line F2.

The dual frequency antenna 320 depicted in FIG. 8 is of particular utility in the radio-frequency LAN and WAN communication system of the present invention. Utilization of antenna 320 allows for the prompter unit 108 of FIG. 1 implemented as data terminal 200 of FIGS. 2–6 to utilize radio-frequency communications on a LAN and a WAN simultaneously on at least two different carrier frequencies. Both LAN radio 214 and WAN radio 218 may be operated simultaneously without having to switch one radio off to operate the other, for example, or without the need to place one radio in standby while the other radio communicates a batch of data. Simultaneous operation of two radios utilizing at least two frequencies simultaneously further allows for the efficient operation and control of radios 214 and 218 by the operating system when the data terminal 200 utilizes multitasking type operating system software, e.g., the operating system software may control the radios simultaneously.

Referring again to FIG. 1, the notifier communication unit 106, the prompter communication unit 108 and the guardian communication unit 116 may utilize or be implemented as any of the embodiments of the data terminals 200 depicted in FIGS. 2–6 and further may utilize or incorporate the embodiments of the antennas 216, 220, 306 and 320 depicted in FIGS. 2–8. The local area radio-frequency network utilized for communications between a notifier unit 106 and a prompter communication unit 108 may utilize a 900 MHz carrier frequency while wide area radio-frequency network utilized for communications between a prompter communication unit 108 and a guardian communication unit 116 may utilize 2.4 GHz carrier frequency thereby making the utilization of the dual frequency antenna 320 of FIG. 8 of particularly utility. All of the communications units 106, 108 and 116 may be NORAND PEN*KEY 6100 hand-held computers available from NORAND corporation, 550 Second Street, SE, Cedar Rapids, Iowa, 52401.

It is believed that route delivery communication system of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A route delivery communication system for collecting and processing order and related data, the route delivery communication system comprising:
   (a) a notifier unit operationally disposed in a product end point location, said notifier unit including a first radio-frequency transceiver for communicating data over a local area radio-frequency network wherein said notifier unit receives product data to be transmitted over the local area radio-frequency network; and
   (b) a prompter unit operationally disposed in a product delivery vehicle, said prompter unit including a second radio-frequency transceiver for communicating data over the local area radio-frequency network wherein said prompter unit communicates with said notifier unit to obtain the received product data when the product delivery vehicle being within communicating range of the local area radio frequency network.

2. The route delivery communication system of claim 1 wherein said notifier unit and said prompter unit each includes a data collection terminal having an input interface wherein data may be collected, processed, updated and transmitted over the local area radio-frequency network.

3. The route delivery communication system of claim 2 wherein said input interface permits an operator at the product endpoint location to enter product data into the notifier unit.

4. The route delivery communication system of claim 2 wherein said input interface automatically enters product data into the notifier unit through a data gathering transducer.

5. The route delivery communication system of claim 2 wherein said data collection terminal further includes a display for communicating with a user at the product end point location.

6. The route delivery communication system of claim 1 wherein said prompter unit polls the notifier unit over the local area radio-frequency network for product data upon the route delivery vehicle entering within range of the local area radio-frequency network.

7. The route delivery communication system of claim 1 wherein said prompter unit activates the notifier over the local area radio-frequency network unit to collect product data upon the route delivery vehicle entering within range of the local area radio-frequency network.

8. The route delivery communication system of claim 1 wherein said prompter unit receives product data from the notifier unit over the local area radio-frequency network upon the route delivery vehicle entering within range of the local area radio-frequency network.

9. The route deliver communication system of claim 1 wherein said notifier unit determines specific product data including identity and quantity of product needed for restocking the product end point location.

10. The route deliver communication system of claim 1 wherein said notifier transmits the specific product data to said prompter unit over the local area radio-frequency network.

11. The route delivery communication system of claim 10 wherein said prompter unit communicates the specific product data transmitted by said notifier unit such that an operator of the route delivery vehicle may determine the specific product data including identity and quantity of product needed for restocking the product end point location.

12. The route delivery communication system of claim 11 wherein the operator of the route delivery vehicle restocks the product end point location based upon the specific product data.

13. The route delivery communication system of claim 1 further comprising a guardian unit operationally disposed at a central management location wherein said prompter unit further includes a third transceiver and wherein said guardian unit includes a fourth transceiver, said third and said fourth transceivers for communicating over a wide area radio-frequency network.

14. The route delivery communication system of claim 13 wherein said prompter unit communicates with said notifier unit over the local area radio-frequency network at a first carrier frequency and communicates with said guardian unit over the wide area radio-frequency network at a second carrier frequency.

15. The route delivery communication system of claim 13 wherein said guardian unit includes a data collection terminal having an input interface wherein data may be collected, processed, updated and transmitted over the wide area radio-frequency network.

16. The route delivery communication system of claim 13 wherein said prompter unit communicates specific product data to said guardian unit such that said guardian unit determines identity and quantity of product required to be restocked at the product end point location.

17. The route delivery communication system of claim 13 wherein said prompter unit includes first and second antennas, the first antenna being operable with the second radio-frequency transceiver and said second antenna being operable with said third radio-frequency transceiver.

18. The route delivery communication system of claim 13 wherein said prompter unit includes a dual-frequency antenna being operable with said second and said third radio-frequency transducers.

19. A route delivery communication system for collecting and processing order and related data, the route delivery communication system comprising:
   (a) a notifier unit operationally disposed in a product end point location, said notifier unit including a first radio-frequency transceiver for communicating data over a local area radio-frequency network wherein said notifier unit receives product data to be transmitted over the local area radio-frequency network;

(b) a prompter unit operationally disposed in a product delivery vehicle, said prompter unit including a second radio-frequency transceiver for communicating data over the local area radio-frequency network wherein said prompter unit communicates with said notifier unit to obtain the received product data when the product delivery vehicle being within communicating range of the local area radio frequency network; and (c) a guardian unit operationally disposed at a central management location wherein said prompter unit further includes a third transceiver and wherein said guardian unit includes a fourth transceiver, said third and said fourth transceivers for communicating over a wide area radio-frequency network.

20. The route delivery communication system of claim 19 wherein said prompter unit communicates with said notifier unit over the local area radio frequency network at a first carrier frequency and communicates with said guardian unit over the wide area radio-frequency network at a second carrier frequency.

21. The route delivery communication system of claim 19 wherein said guardian unit includes a data collection terminal having an input interface wherein data may be collected, processed, updated and transmitted over the wide area radio-frequency network.

22. The route delivery communication system of claim 19 wherein said prompter unit communicates specific product data to said guardian unit such that said guardian unit determines identity and quantity of product required to be restocked at the product end point location.

23. The route delivery communication system of claim 19 wherein said prompter unit includes first and second antennas, the first antenna being operable with the second radio-frequency transceiver and said second antenna being operable with said third radio-frequency transceiver.

24. The route delivery communication system of claim 19 wherein said prompter unit includes a dual-frequency antenna being operable with said second and said third radio-frequency transducers.

25. A route delivery communication system for collecting and processing order and related data, the route delivery communication system comprising:

(a) a notifier unit operationally disposed in a product end point location, said notifier unit including a first radio-frequency transceiver for communicating data over a local area radio-frequency network wherein said notifier unit receives product data to be transmitted over the local area radio-frequency network;

(b) a prompter unit operationally disposed in a product delivery vehicle, said prompter unit including a second radio-frequency transceiver for communicating data over the local area radio-frequency network wherein said prompter unit communicates with said notifier unit to obtain the received product data when the product delivery vehicle being within communicating range of the local area radio frequency network; and (c) a reporter for reporting said received product data such that route delivery personnel may deliver the required quantity and type of product to said product end point location.

* * * * *